United States Patent [19]
Boyle

[11] 3,857,431
[45] Dec. 31, 1974

[54] TIRE REMOVAL TOOL
[76] Inventor: Elbert I. Boyle, Rt. 1, Ripley, Okla.
[22] Filed: Oct. 10, 1972
[21] Appl. No.: 296,337

[52] U.S. Cl. .............................................. 157/1.26
[51] Int. Cl. ............................................ B60c 25/06
[58] Field of Search ......... 157/1.17, 1.2, 1.26, 1.28, 157/1.33

[56] References Cited
UNITED STATES PATENTS

| | | | |
|---|---|---|---|
| 1,447,113 | 2/1923 | Woodhall | 157/1.26 |
| 1,793,607 | 2/1931 | Goodman | 157/1.28 |
| 2,784,777 | 3/1957 | Ammann | 157/1.26 |
| 2,798,540 | 7/1957 | Branick | 157/1.26 |

*Primary Examiner*—Al Lawrence Smith
*Assistant Examiner*—Harold P. Smith, Jr.
*Attorney, Agent, or Firm*—William R. Laney

[57] ABSTRACT

A tire removal tool for removing tractor tires, including a pair of arms which are interconnected intermediate their ends to permit opposed ends of the arms to be pivoted toward and away from each other. A hydraulic jack is mounted between two opposed ends of the arms, and a pair of insert jaws are carried by the other ends of the arms. The inset jaws are each provided with a bead on the exposed face thereof facilitating engagement of the jaw with the rim upon which a pneumatic tire is mounted.

6 Claims, 3 Drawing Figures

PATENTED DEC 31 1974　　　　　　　　　　　　　　　　3,857,431

TIRE REMOVAL TOOL

BACKGROUND OF THE INVENTION

1. Field of the Invention

This invention relates to tools for removing large tires, such as tractor tires, from the rims upon which they are mounted for purposes of repair or replacement.

2. Brief Description of the Prior Art

It is sometimes a difficult task to remove large pneumatic tires from the rims upon which they are mounted. Tires of this type, such as those used on tractors and heavy road working implements, require forces of large magnitude to break the tires loose from the rim, and are often accessible only in a field location where portable equipment must employed for removing the tire from the rim. For the purpose of effecting such removal, a number of devices have heretofore been proposed, and many of them have been patented.

In U.S. Pat. No. 2,579,868, a tire removal tool is depicted and described. This tool includes a pair of articulated arms which are pivotally connected to each other at a central point to permit leverage to be applied to a pair of jaws carried at the ends of the arms by moving the opposite ends of the arms toward or away from each other. The jaws are constructed so that the jaws bear concurrently against the tire at opposite sides thereof and adjacent the rim, and force the tire inwardly so that one side is broken away from the rim initially. The jaw at that side of the tool where the tire is initially broken away then moves inwardly with respect to the rim until a flange or lip engages the rim. At this time, the jaw on the opposite side of the tire and carried by the other arm of the tool continues to move inwardly until that side of the tire is broken away from the rim.

Other tools have been proposed for effecting this type of tire removal function. Many of these, however, are not portable, and thus cannot be taken into remote field locations for the purpose of removing the tires of tractors or other heavy vehicles. Examples of other tools used for removing large tires are to be found in U.S. Pat. Nos. 2,439,135; 2,599,232; 1,066,210 and 1,447,113.

BRIEF DESCRIPTION OF THE PRESENT INVENTION

The present invention provides a relatively lightweight, portable tire removal tool which can be utilized for quickly and easily demounting large tires of the type carried by tractors, trucks and heavy vehicles. The tool is manually operated and uncomplicated.

Broadly described, the tool of the invention comprises a pair of pivotally interconnected arms which, by the pivotal connection which is located intermediate the ends of the arms, may be articulated so as to converge a pair of inset jaws carried at two aligned, opposed ends of the arms. The opposite ends of the arms are connected to a hydraulic jack which is located therebetween, and which is used for biasing the arms to a position where the jaws carried thereby grip or engage the rim upon which the tire to be removed is mounted, and concurrently, a portion of the tire mounted on such rim.

The jaws which are carried on the arms at one of the ends thereof are inset with respect to the arms so that the arms may pass around the opposite sides of a tire to be removed from the rim without obstruction or interference. Each jaw is provided with a bead extending across the face thereof to prevent the jaw from slipping out of engagement with the rim of the tire when the tool is in use.

It is an object of the present invention to provide a portable, manual tire removal tool which can be used for removing tractor tires and the like.

A further object of the invention is to provide a tire removal tool which develops sufficient power to facilitate the removal of pneumatic tires of substantially any size, including oversized tires, from the rims upon which they are mounted.

An additional object of the invention is to provide a tire removal tool which is constructed for non-slip engagement of one jaw of the tool with the rim upon which the tire to be removed is mounted, while another portion of the tool quickly and effectively breaks the tire away from the rim at the opposite side thereof.

An additional object of the invention is to provide a tire removal tool which is inexpensive to contruct, is mechanically sturdy and is characterized in having a long and trouble-free operating life, which tool can be used without damaging the tire in any way.

Additional objects and advantages of the invention will become apparent as the following detailed description of the invention is read in conjunction with the accompanying drawings which illustrate the invention.

DETAILED DESCRIPTION OF A PREFERRED EMBODIMENT OF THE INVENTION

Figures 1, 2:
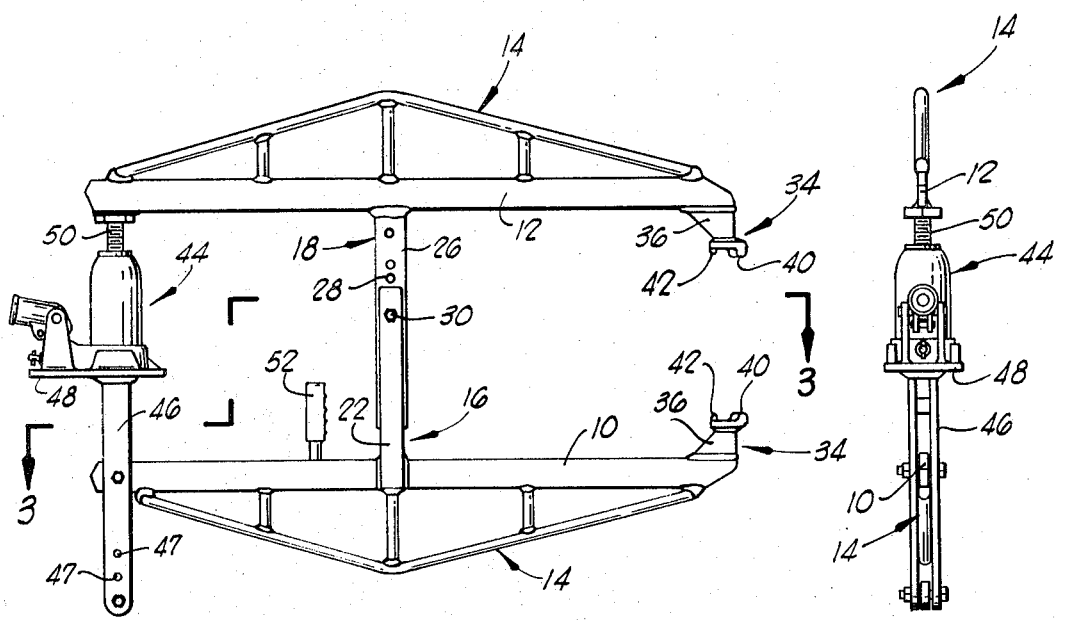
FIG. 1 is an elevation view of the tire tool of the invention.
FIG. 2 is an end elevation view of the tire tool.
Figure 3:
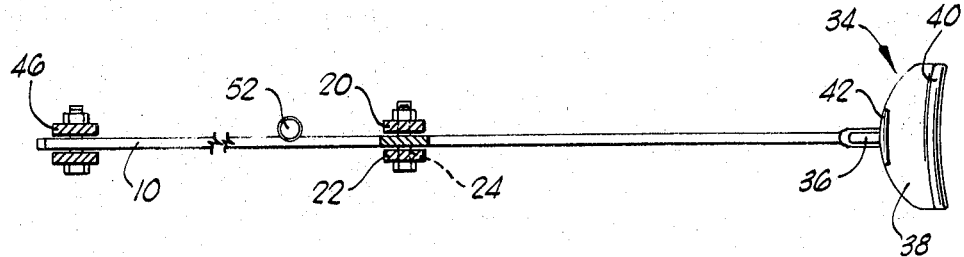
FIG. 3 is a sectional view taken along line 3—3 of FIG. 1.

Referring initially to FIG. 1 of the drawing, the tire tool of the invention includes a pair of elongated arms 10 and 12. Each of the arms is provided with truss bracing 14 to prevent the arm from bending or collapsing when the tool is in use. Welded or otherwise suitably secured to each arm is a pivot post structure designated generally by reference numeral 16 in the case of the arm 10, and 18 in the case of the arm 12.

The pivot post structure 16 is a bifurcated bracket which includes a pair of members 20 and 22 projecting substantially normal to the arm 10, and including a pair of aligned holes 24 near the outer ends of the members. The pivot post structure 18 is a single member 26 projecting substantially normal to the arm 12, and having a plurality of spaced holes 28 along the length thereof positioned for registry with the holes 24 at a time when the member 26 is inserted between the members 20 and 22. A suitable pivot pin or bolt 30 is extended through the holes 24 in the members 20 and 22, and through a selected hole 28 in the member 26 to allow the arms 10 and 12 to be interconnected for pivotal movement with respect to each other in a manner and for a purpose hereinafter described in greater detail.

At one opposed pair of ends of the arms 10 and 12, each arm carries a jaw 34. Each of the jaws 34 is inset from the arm upon which it is mounted by a spacer plate 36, and each jaw has a substantially flat face 38 having an arcuate rib or bead 40 built up along one edge of the face, and extending thereacross. A lip 42 is provided adjacent the other edge of the face 38. Each jaw 34 is shaped as a substantially semi-circular plate.

At the opposite ends of the arms 10 and 12 from the ends upon which the jaws 34 are mounted, a hydraulic jack 44 is positioned between the arms for the purpose of biasing the arms apart from each other and, due to the articulated connection between the arms, moving the jaws 34 in a converging movement with respect to each other. A pivoted, jack supporting rod 46 is pivotally secured intermediate its length to the arm 10, and carries at its end nearest the arm 12, a mounting plate 48. The base of the hydraulic jack 44 is secured to the mounting plate 48, and the extensible shaft 50 of the jack is preferably pivotally secured in a socket formed in the end of the arm 12. A handle 52 is secured to the arm 10 and projects at a right angle therefrom toward the arm 12. The jack supporting rod 46 has a plurality of apertures 47 therein to facilitate adjustment of the point at which it is connected to the arm 10.

OPERATION

In utilizing the tire removal tool of the invention, the tool is transported manually to a location where the vehicle from which the tire is to be removed is located. The arms 10 and 12 of the tool are then passed around opposite sides of the tire until the jaws 34 are positioned opposite the location at which the rim engages the radially inner bead or flange of the tire. At this point, one of the jaws 34 is placed against the rim of the tractor so that the arcuate rib or bead 40 bears against the rim at the edge thereof. The other jaw 34 is positioned so that it bears against the side wall of the tire on the opposite side of the tire from the jaw of the tool which is in engagement with the rim. The hydraulic jack is then actuated to bias the ends of the arms 10 and 12 between which it is located apart from each other. This causes the jaw 34 bearing against the side wall of the tire to move inwardly and break this portion of the tire away from the rim at that side of the tire.

Once the tire is broken away from the rim, the tool is canted to one side, and the procedure is reversed. That is, the jaw 34 which has been used to force the tire inwardly and away from the rim is then placed on the rim, and is prevented from slipping therefrom by the bead 40. The jaw 34 on the opposite side of the tool then moves inwardly against the tire wall to break that side of the tire away from the rim. After the tire has been broken away from the rim, it can be removed from the rim by conventional methods.

During manipulation of the tire removal tool, the handle 52 can be gripped in one hand, and the knees or legs used to support the opposite end of the tire tool by bearing against the jack supporting rod 46. Concurrently, the jack is operated with the other hand to force the jaws 34 inwardly toward each other.

The present invention provides an improved tire removal tool which is easily portable, manually operable, and is characterized in having a long and trouble-free operating life. Although a preferred embodiment of the invention has been herein described and illustrated in the drawings, it will be understood that various changes and innovations can be effected in the structure discussed without departure from the basic principles of the invention. Changes and innovations of this type are therefore deemed to be circumscribed by the spirit and scope of the invention, except as the same may be necessarily limited by the appended claims or reasonable equivalents thereof.

I claim:

1. A tire removal tool comprising:
   a pair of elongated arms pivotally interconnected intermediate their length;
   a jaw carried on one end of each of said arms so that said jaws face each other, each of said jaws being inset from the arm upon which it is carried toward the other of said arms, and including:
   a flat face; and
   an arcuate bead extending along one edge of the face;
   a pivoted jack supporting rod having an intermediate portion thereof connected to one of said arms at its end opposite the end carrying said jaw, and projecting toward the other of said arms;
   a mounting plate secured to the end of said jack supporting rod nearest said other arm;
   a hydraulic jack having a base secured to said mounting plate and extending from said mounting plate to said other arm at its end opposite the end which carries said jaw for biasing the jaws in pivotal movement relative to each other; and
   a handle projecting from one of the arms toward the other arm for holding the tool in a tire removing position.

2. A tire removal tool as defined in claim 1, and further characterized in including:
   a first pivot post structure projecting from a central portion of one of said arms toward the other of said arms; and
   a second pivot post structure projecting from a central portion of the other of said arms toward said one arm and pivotally interconnected to said first pivot post structure.

3. A tire removal tool as defined in claim 2 wherein

Said first pivot post structure is a bifurcated bracket including a pair of substantially parallel members having a pair of aligned holes therein;
   said second pivot post structure is a member having one end secured to said other arm and projecting between the parallel members of said first pivot post structure, said second pivot post structure member having a plurality of spaced holes formed therethrough for selective registration with said pair of aligned holes; and
   a pivot pin pivotally interconnecting said first and second pivot post structures by extension through said registering holes therein.

4. A tire removal tool as defined in claim 3 wherein said arms include truss braces structurally reinforcing said arms.

5. A tire removal tool comprising:
   a pair of elongated arms;
   a first pivot post structure secured to, and projecting from, a central portion of one of said arms toward the other of said arms, said first pivot post structure including a bifurcated bracket having a pair of substantially parallel members having a pair of aligned holes therethrough;
   a second pivot post structure secured to, and projecting from, a central portion of the other of said arms toward said one arm, said second pivot post structure including a member having one end secured to said other arm and projecting between the parallel members of said first pivot post structure, said second pivot post structure member having a plurality of spaced holes formed therethrough for selective registration with said pair of aligned holes;

a pivot pin pivotally interconnecting said first and second pivot post structures by extension through said registering holes therein;

a jaw carried on one end of each of said arms so that said jaws face each other, each of said jaws being inset from the arm upon which it is carried toward the other of said arms, and including:

a flat face; and an arcuate bead extending along one edge of the face;

jack means positioned between the ends of said arms opposite the ends which carry said jaws for biasing the jaws in pivotal movement relative to each other; and a handle projecting from one of the arms toward the other arm for holding the tool in a tire removing position.

6. A tire removal tool comprising:

a pair of elongated arms pivotally interconnected intermediate their length;

a jaw carried on one end of each of said arms so that said arms face each other, each of said jaws being inset from the arm upon which it is carried toward the other of said arms;

jack means positioned between the ends of said arms opposite the ends which carry said jaws for biasing the jaws in pivotal movement relative to each other, said jack means including:

a jack supporting rod having an intermediate portion thereof pivotally connected to one of said arms at its end opposite the end carrying said jaw, and projecting toward the other of said arms; and a mounting plate secured to the end of said jack supporting rod nearest said other arm and having the base of said hydraulic jack secured thereto; and a handle projecting from one of said arms toward the other of said arms and disposed at a location between said pivoted jack supporting rod and the point of pivotal interconnection of said elongated arms to each other whereby the portion of said jack supporting rod on the opposite side of its point of pivotal connection to one of said arms from said mounting plate can be gripped in one hand, concurrently with the gripping of said handle with the other hand, for positioning said tire removal tool in a tire removing position.

* * * * *